(12) United States Patent
Brenner et al.

(10) Patent No.: US 8,709,199 B2
(45) Date of Patent: Apr. 29, 2014

(54) METHOD OF PREPARING A WATER VAPOR TRANSFER MEMBRANE

(75) Inventors: Annette M. Brenner, Honeoye Falls, NY (US); Shawn M. Clapham, Canandaigua, NY (US); Lijun Zou, Rochester, NY (US); Timothy J. Fuller, Pittsford, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 358 days.

(21) Appl. No.: 13/231,033

(22) Filed: Sep. 13, 2011

(65) Prior Publication Data

US 2013/0062278 A1   Mar. 14, 2013

(51) Int. Cl.
*B32B 27/24* (2006.01)
*B01D 71/06* (2006.01)
*C09J 5/02* (2006.01)
*H01M 2/14* (2006.01)

(52) U.S. Cl.
USPC ............ 156/308.6; 156/279; 156/309.3; 156/168; 156/169; 210/500.38; 210/490; 210/500.27

(58) Field of Classification Search
CPC .................................. H01M 2/14; B32B 27/24
USPC ............ 210/500.27, 500.36, 490, 640; 156/308.6, 278, 168, 309.3; 527/21; 429/129

See application file for complete search history.

(56) References Cited

U.S. PATENT DOCUMENTS

| | | | |
|---|---|---|---|
| 5,082,472 A * | 1/1992 | Mallouk et al. | 95/49 |
| 5,447,636 A * | 9/1995 | Banerjee | 210/638 |
| 6,627,035 B2 * | 9/2003 | Fan et al. | 156/308.2 |
| 7,691,266 B2 * | 4/2010 | Fendya et al. | 210/321.76 |
| 7,749,661 B2 | 7/2010 | Zhang et al. | |
| 7,875,396 B2 | 1/2011 | Zhang et al. | |
| 7,906,052 B2 * | 3/2011 | Hadj Romdhane et al. | 264/171.1 |
| 2009/0092863 A1 | 4/2009 | Skala | |
| 2009/0123641 A1* | 5/2009 | Hadj Romdhane et al. | 427/58 |
| 2010/0291462 A1* | 11/2010 | Thate et al. | 429/483 |
| 2011/0053010 A1 | 3/2011 | MacKinnon et al. | |
| 2011/0053037 A1 | 3/2011 | MacKinnon et al. | |
| 2011/0143620 A1 | 6/2011 | Wu | 442/121 |
| 2011/0165406 A1 | 7/2011 | Burger et al. | 428/306.6 |
| 2012/0076990 A1* | 3/2012 | Merlo et al. | 428/189 |
| 2012/0189942 A1* | 7/2012 | Moose et al. | 429/481 |
| 2013/0062278 A1 | 3/2013 | Brenner et al. | 210/500.27 |
| 2013/0087936 A1* | 4/2013 | Brenner et al. | 261/100 |
| 2013/0202987 A1* | 8/2013 | Zou et al. | 429/492 |

* cited by examiner

*Primary Examiner* — Ana Fortuna
(74) *Attorney, Agent, or Firm* — Dinsmore & Shohl LLP

(57) ABSTRACT

A method of making a water vapor transport membrane is described. The method can include providing two sheets, each sheet comprising a support layer with an ionomer layer thereon; applying a solvent to at least one sheet; and contacting the ionomer layers of the two sheets to form a composite membrane comprising a composite ionomer layer between the two support layers. A composite membrane is also described.

16 Claims, 4 Drawing Sheets

METHOD OF PREPARING A WATER VAPOR TRANSFER MEMBRANE

BACKGROUND OF THE INVENTION

This invention relates generally to a fuel cell humidifier unit, and more particularly to the construction of a water-permeable membrane within the humidifier and a method for making the same.

In many fuel cell systems, hydrogen or a hydrogen-rich gas is supplied through a flowfield to the anode side of a fuel cell while oxygen (such as in the form of atmospheric oxygen) is supplied through a separate flowfield to the cathode side of the fuel cell. An appropriate catalyst (for example, platinum) is typically disposed as a layer on porous diffusion media that is typically made from a carbon fabric or paper such that the combination exhibits resiliency, electrical conductivity, and gas permeability. The catalyzed diffusion media is used to facilitate hydrogen oxidation at the anode side and oxygen reduction at the cathode side. An electric current produced by the dissociation of the hydrogen at the anode is passed from the catalyzed portion of the diffusion media and through a separate circuit such that it can be the source of useful work, while the ionized hydrogen passes through another medium situated between the diffusion media of the anode and cathode. Upon such passage, the ionized hydrogen combines with ionized oxygen at the cathode to form high temperature water vapor as a reaction byproduct. In one form of fuel cell, called the proton exchange membrane or polymer electrolyte membrane (in either event, PEM) fuel cell, the medium for ionized hydrogen passage is an electrolyte in the form of a perfluorinated sulfonic acid (PFSA) ionomer membrane (such as Nafion®). This layered structure of the membrane surrounded on opposing sides by the catalyzed diffusion media is commonly referred to as a membrane electrode assembly (MEA), and forms a single fuel cell. Many such single cells can be combined to form a fuel cell stack, increasing the power output thereof.

Fuel cells, particularly PEM fuel cells, require balanced water levels to ensure proper operation. For example, it is important to avoid having too much water in the fuel cell, which can result in the flooding or related blockage of the reactant flowfield channels. On the other hand, too little hydration limits the electrical conductivity of the membrane and can lead to premature cell failure. Increasing the difficulty in maintaining a balance in water level is that there are numerous conflicting reactions taking place in a fuel cell that are simultaneously increasing and decreasing local and global hydration levels.

One method of ensuring adequate levels of hydration throughout the fuel cell includes humidifying one or both of the reactants before they enter the fuel cell. For example, residual water present at the cathode exhaust can be used with an appropriate humidification device to reduce the likelihood of dehydration of the anode, the PFSA ionomer membrane, or the cathode inlet. One such humidification device is a water vapor transfer (WVT) unit, which may also be referred to as a membrane humidifier, fuel cell humidifier, or related assembly. The WVT unit extracts the moisture from a humid fuel cell exhaust flowpath and places it into the feed path of a reactant low in humidity. Wet-side and dry-side reactant flowpaths (for example, a cathode exhaust and a cathode inlet) are in moisture-exchange communication with one another in the WVT unit through one or more separators (also known as separator plates). In a particular manufacturing approach, the separator is formed continuously as a roll with a pair of planar porous layers and a support spaced apart by elongated strings placed between them. From this continuous roll, the WVT unit can be cut into sizes and shapes needed for a particular fuel cell application. Examples of WVT units may be found in U.S. Pat. Nos. 7,749,661 and 7,875,396, as well as US Published Patent Application 2009/0092863, all of which are assigned to the assignee of the present invention and the entire contents of which are herein incorporated fully by reference.

The exchange of humidity is generally accomplished in the WVT unit by using an ionomer membrane disposed between adjacent high humidity and low humidity fluid flowpaths formed in the separators. The generally planar membrane (which may structurally resemble that of the PFSA membrane discussed above) allows water vapor to pass from the higher humidity fluid on one side to the lower humidity fluid on the other while inhibiting the direct mixing of the two fluids, for example, the cathode inlet and cathode exhaust that are being conveyed through the flowpaths. In one form of construction, the ionomer membrane is attached to an adjacent support layer (which may be a thin layer of expanded poly(tetrafluoroethylene) (ePTFE) or related material to increase the robustness and handleability of the membrane and support, as well as to avoid migration of the ionomer into a porous support. Despite such layering, the combination remains fragile where, in one typical form, the ionomer membrane may be between 3 and 10 microns thick, while the support (made, for example, from expanded poly(tetrafluoroethylene) (ePTFE)) may be about 10 to 30 microns thick and collapse down to about 5 to about 20 um thick when in contact with the dispersion.

Existing processes associated with WVT unit fabrication may expose the ionomer membrane and support to excessive handling and related harsh conditions that could jeopardize membrane integrity through failure modes such as crossover. Likewise, existing processes that end up scrapping significant portions of ionomer membrane result in waste and related cost increases. As stated above, the separator is produced in roll form; in such form, the ionomer membrane is on a supporting layer of backer material which must be removed as part of the separator plate manufacturing process. These features significantly contribute to the overall cost of incorporating ionomer membranes into the WVT unit. As such, approaches that would reduce both the handling and cost issues associated with such membrane material are preferred.

SUMMARY OF THE INVENTION

One aspect of the invention is a method of making a water vapor transport membrane. In one embodiment, the method includes providing two sheets, each sheet comprising a support layer with an ionomer layer thereon; applying a solvent to at least one sheet; and contacting the ionomer layers of the two sheets to form a composite membrane comprising a composite ionomer layer between the two support layers.

Another aspect of the invention is a composite membrane. In one embodiment, the composite membrane includes a composite ionomer layer between a pair of support layers, the composite ionomer layer comprising at least two ionomer sublayers.

BRIEF DESCRIPTION OF THE DRAWINGS

The following detailed description of specific embodiments can be best understood when read in conjunction with the following drawings, where like structure is indicated with like reference numerals and in which.

DETAILED DESCRIPTION OF THE PREFERRED EMBODIMENTS

Figure 1:
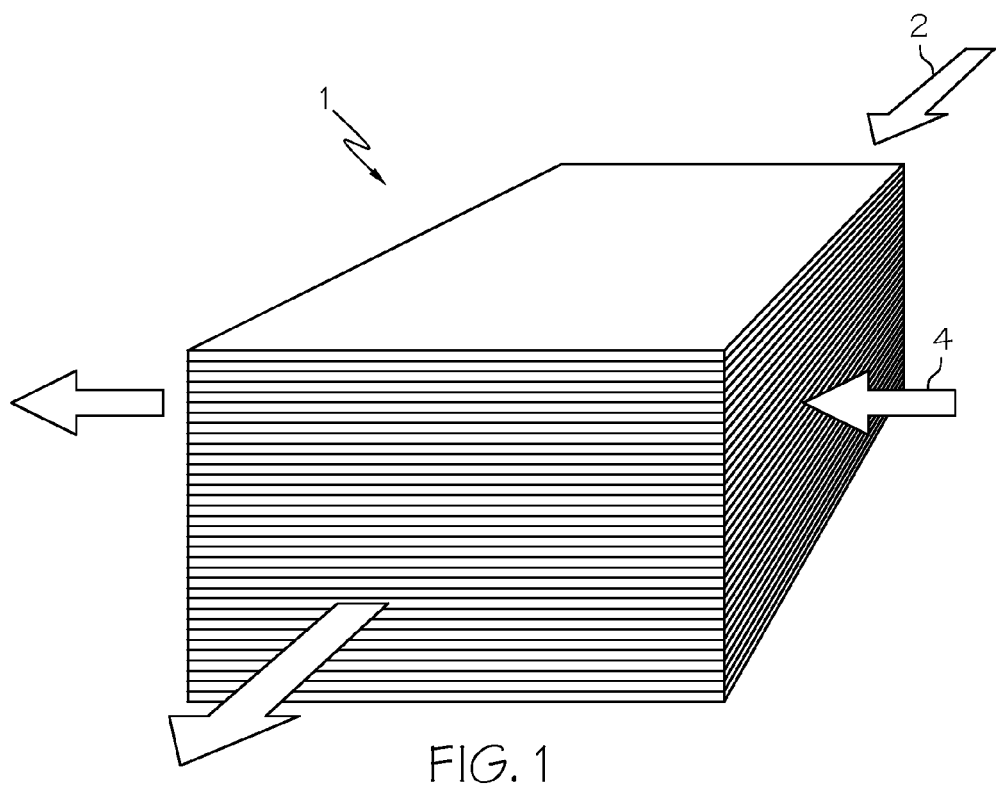
FIG. 1 shows a simplified version of a WVT unit and the humidity-exchange flowpaths therethrough.

FIG. 1 illustrates a WVT unit 1 with multiple layers of wet and dry separators for the exchange of moisture. In one form, the wet flow 2 may be that coming from a fuel cell cathode exhaust, while the dry flow 4 may be the inlet to the fuel cell cathode, although it will be appreciated that other flowpaths are also within the scope of the present invention.

The method allows the production of leak-free WVT membranes having thick ionomer layers, which provides greater durability and longer life for the membrane. The process is simple and scalable. It allows WVT core manufacturability with existing assembly methods. It reduces the potential for defects to affect performance because the defects in each sheet would have to line up in order to provide a leak path. It will also allow the preparation of a WVT membrane with different ionomer layers and/or different support layers on each side.

By "leak-free," we mean less than 2% air crossover throughout the life of the WVT unit, less than 150 GPU, measured with a set pressure difference between the two sides, typically 3 psi.

Figure 2A:
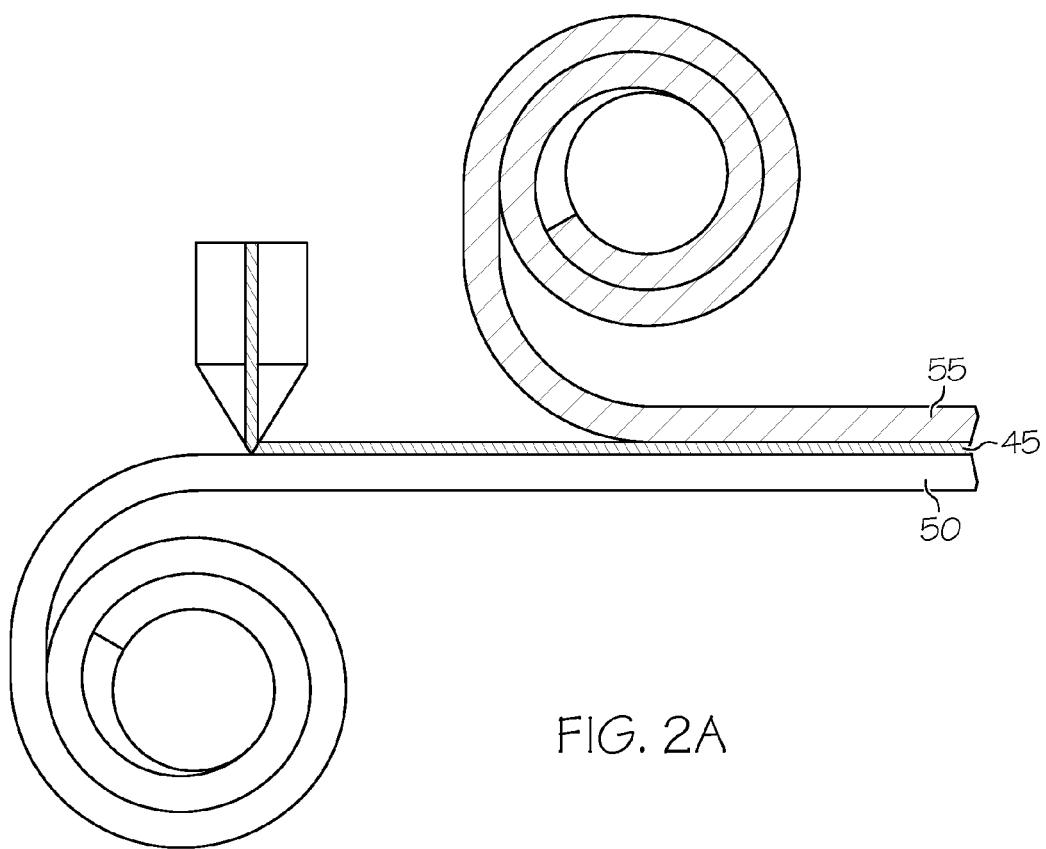
FIGS. 2A-C show one embodiment of a process for preparing a water vapor transport membrane according to an aspect of the present invention.
Figure 2B:
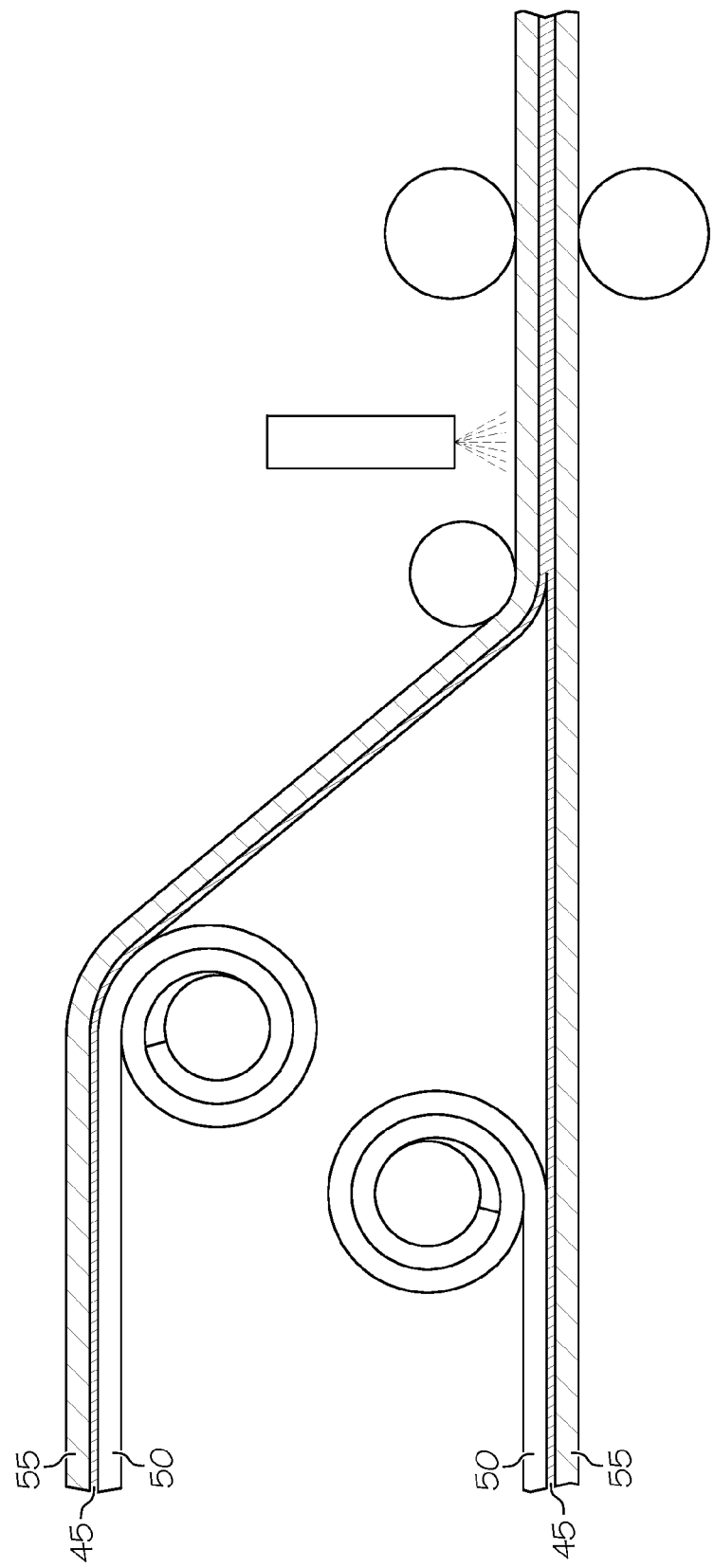

FIG. 2 shows one embodiment of a method of making a WVT membrane according to the present invention. As shown in FIG. 2A, the ionomer membrane layer 45 is coated onto a backer layer 50, and support layer 55 is wet laminated to ionomer membrane layer 45. The backer layer 50 is then removed. As shown in FIG. 2B, solvent is applied to the support layer 55 side of one or both of the ionomer membrane structures. The solvent can be applied using any suitable process, such as spraying. The solvent permeates the support layer 55 and the ionomer membrane layer 45 and makes the ionomer tacky. Alternatively, the solvent can be applied to the ionomer side of the structure. If the solvent is applied to the ionomer side, it could also include ionomer, if desired. Any solvent that makes the ionomer tacky can be used. Suitable solvents include, but are not limited to, alcohols, such as isopropanol.

Figure 2C:
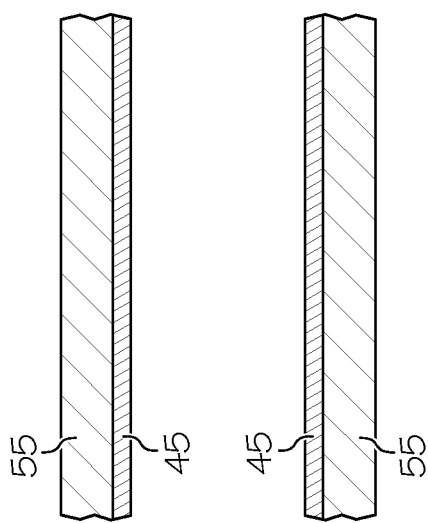
Figure 3:
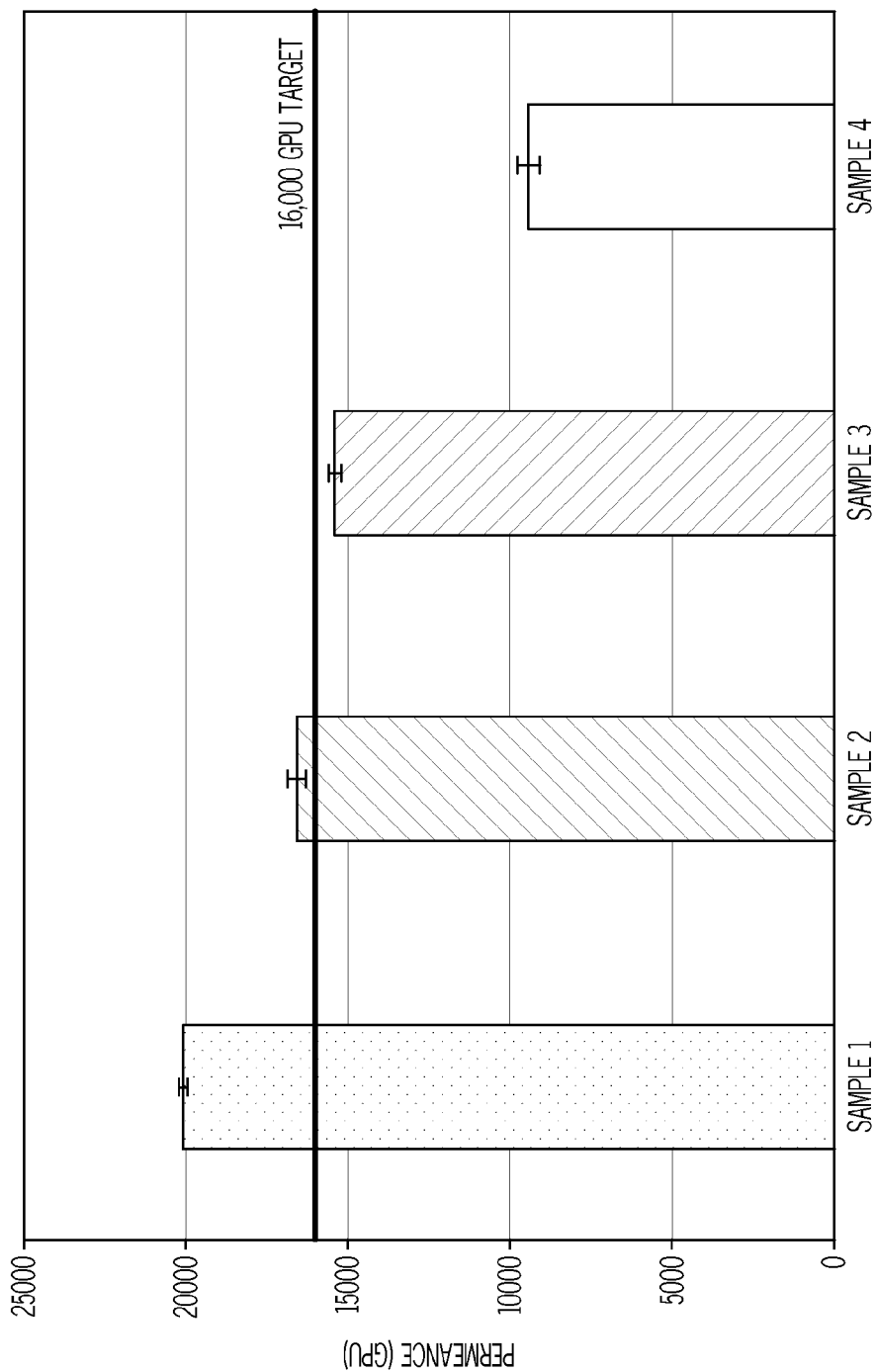
FIG. 3 is a graph showing the WVT for samples made according to different embodiments of the present invention.

As shown in FIG. 2C, the ionomer membrane layer 45 sides of two ionomer membrane structures are placed in contact to make a composite membrane 80 including the composite ionomer layer 85 sandwiched between the two support layers 55. When the structure is dry, the two ionomer membrane layers are glued together. Simple contact is sufficient to join the two ionomer membrane layers together. Neither heat nor compression are required to form the composite membrane 80, although either or both can be used, if desired.

Suitable ionomers include, but are not limited to PFSA ionomer, such as for example Nafion®, or Aquivion®, or perfluorocyclobutane (PFCB) ionomer. One suitable PFSA ionomer is Aquivion® D70-20BS, which is a short side chain PFSA-based ionomer with a 700 EW. Suitable PFCB ionomers are described in U.S. application Ser. Nos. 12/549,881, 12/549,885, and 12/549,904, each of which is incorporated herein by reference.

The final composite ionomer layer is typically greater than about 5 microns in thickness, or greater than about 6 microns in thickness, or greater than about 7 microns in thickness, or greater than about 8 microns in thickness, or greater than about 9 microns in thickness, or greater than about 10 microns in thickness, or greater than about 11 microns in thickness, or greater than about 12 microns in thickness, or greater than about 13 microns in thickness, or greater than about 14 microns in thickness, or greater than about 15 microns in thickness, or about 5 to about 15 microns, or about 6 to about 15 microns, or about 7 to about 15 microns, or about 8 to about 15 microns, or about 9 to about 15 microns, or about 5 to about 10 microns, or about 6 to about 10 microns, or about 7 to about 10 microns, or about 8 to about 10 microns, or about 9 to about 10 microns. The tradeoff is performance, cost, and durability.

The composite membrane desirably has a beginning of life water vapor transfer of at least about 8,000 GPU, or at least about 10,000 GPU, or at least about 12,000 GPU, or at least about 14,000 GPU, or at least about 15,000 GPU, or at least about 16,000 GPU. For a compact fuel cell humidifier application, the membrane will generally have a permeance of greater than about 8,000 gas permeation units (GPU) (GPU is a partial pressure normalized flux where 1 GPU=$10^{-6}$ $cm^3$ (STP)/($cm^2$ sec cm Hg)), and typically in the range of about 10,000-12,000 GPU for a 25 μm homogeneous Nafion®. Beginning of life indicates the performance within the first twenty hours following any break-in period.

Example

A backer material of fluorinated ethylene-propylene (FEP)-coated polyimide film backer material (e.g., Kapton® 120FN616, 1 mil available from DuPont), was coated with PFSA ionomer. An ePTFE support layer was laid down on the wet ionomer. After drying, the backer material was removed. The ionomer layer was 3-10 microns thick. The ePFTE side of one sheet was sprayed with isopropanol, and the ionomer side of a second sheet was hand pressed onto it at room temperature. The pressure on a soft roller was contact pressure sufficient to remove any trapped air bubbles between layers. The final composite had a first ePTFE layer about 4.1 microns thick, a 5.4 micron thick composite ionomer layer, and a second ePTFE layer 4.8 microns thick.

A second composite membrane was made by coating a backer material of fluorinated ethylene-propylene (FEP)-coated polyimide film backer material (e.g., Kapton® 120FN616, 1 mil available from DuPont), with PFCB ionomer, and applying ePTFE to the wet ionomer. The ePFTE side of a sheet was sprayed with isopropanol, and the ionomer side of two sheets were hand pressed together at room temperature.

The water vapor transfer of the single sheet and composite membrane made with Aquivion® D70-20BS (Samples 1 and 2) and with PFCB (Samples 3 and 4) were measured. Samples 1 and 3 were single sided structures of ionomer/ePTFE, and samples 2 and 4 were double sided composite structures of ePTFE/ionomer composite/ePTFE. The composite membrane made with Aquivion® D70-20BS (Sample 2) exceeded a beginning of life water vapor transfer of 16,000 GPU (GPU is a partial pressure normalized flux where 1 GPU=$10^{-6}$ $cm^3$ (STP)/($cm^2$ sec cm Hg)). The composite membrane made with PFCB (Sample 4) had a beginning of life water vapor transfer of almost 10,000 GPU.

The beginning of life water vapor transfer was measured using a 50 $cm^2$ membrane area, and straight flowfields with a similar geometry to that shown in U.S. Pat. No. 7,875,396, counter flow, with a dry side flow of 11.5 slpm, 80 C, 183 kPaa, and wet side flow of 10 slpm, 80 C, 160 kPaa. It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "device" is utilized herein to represent a combination of components and individual components, regardless of whether the components are combined with other components. For example, a "device" according to the present invention may comprise an electrochemical conversion assembly or fuel cell, a vehicle incorporating an electrochemical conversion assembly according to the present invention, etc.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A method of making a water vapor transport membrane comprising:
   providing two sheets, each sheet comprising a support layer with an ionomer layer thereon;
   applying a solvent to the support layer of at least one of the sheets; and
   contacting the ionomer layers of the two sheets to form a composite membrane comprising a composite ionomer layer between the two support layers.

2. The method of claim 1 wherein the solvent is an alcohol.

3. The method of claim 1 wherein the solvent is isopropanol.

4. The method of claim 1 further comprising drying the composite membrane.

5. The method of claim 1 wherein the composite ionomer layer has a thickness greater than about 5 microns.

6. The method of claim 1 wherein the support layer is ePTFE.

7. The method of claim 1 wherein providing the support layer with the ionomer layer with each sheet comprises:
   coating an ionomer layer on a backer layer;
   applying the support layer to the wet ionomer layer such that the ionomer layer is provided on the support layer;
   drying the wet ionomer layer with the support layer; and
   removing the backer layer.

8. The method of claim 1 wherein the composite membrane has a beginning of life water vapor transfer of at least about 10,000 GPU.

9. The method of claim 1 wherein the composite membrane has a beginning of life water vapor transfer of at least about 14,000 GPU.

10. The method of claim 1 wherein the composite membrane has a beginning of life water vapor transfer of at least about 16,000 GPU.

11. The method of claim 1 wherein the two ionomer layers are made of different ionomer.

12. The method of claim 1 wherein the two support layers are made of different materials.

13. A method of making a water vapor transport membrane comprising:
   coating an ionomer layer on a backer layer;
   applying a support layer to the wet ionomer layer such that one is placed on the other;
   drying the wet ionomer layer;
   removing the backer layer to form a first sheet comprising a the support layer and the ionomer layer thereon;
   applying a solvent to the support layer of at least one of the first sheet and a second sheet; and
   contacting the two sheets to form a composite membrane comprising a composite ionomer layer between the first and second support layers.

14. The method of claim 13 wherein the composite membrane has a beginning of life water vapor transfer of at least about 10,000 GPU.

15. The method of claim 13 wherein the two ionomer layers are made of different ionomers.

16. The method of claim 13 wherein the two support layers are made of different materials.

* * * * *